No. 655,827. Patented Aug. 14, 1900.
T. J. LOVETT.
CUSHIONED HORSESHOE.
(Application filed June 17, 1898.)

(No Model.) 2 Sheets—Sheet 1.

WITNESSES, INVENTOR
Ira L. Fish Thomas J. Lovett
R. A. Bates BY Wilmarth H. Thurston
ATT'Y.

THE NORRIS PETERS CO., PHOTO-LITHO., WASHINGTON, D. C.

No. 655,827. Patented Aug. 14, 1900.
T. J. LOVETT.
CUSHIONED HORSESHOE.
(Application filed June 17, 1898.)
(No Model.) 2 Sheets—Sheet 2.
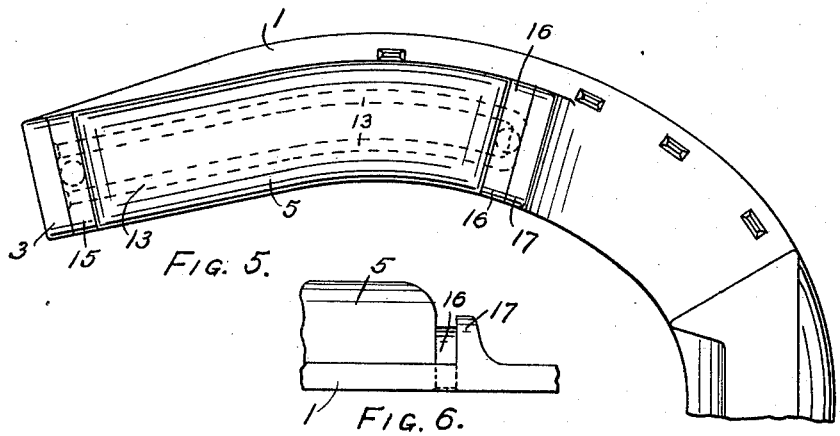
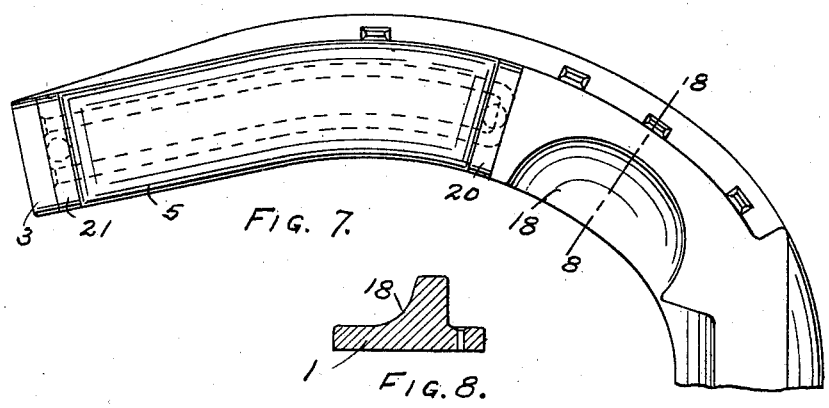
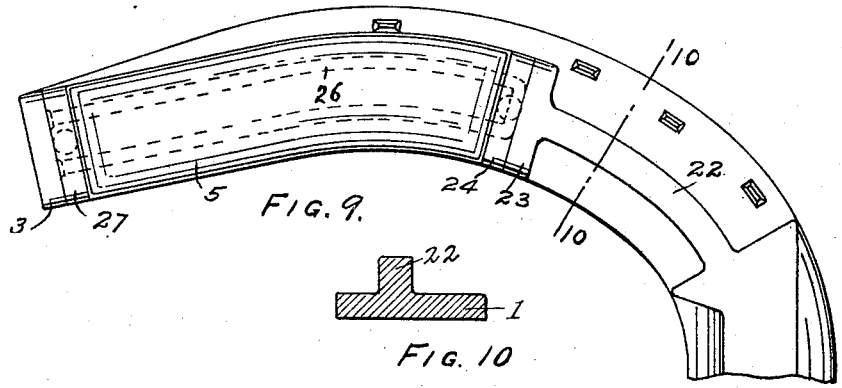
WITNESSES, INVENTOR,
Thomas J. Lovett
BY Wilmarth H. Thurston
ATT'Y.

UNITED STATES PATENT OFFICE.

THOMAS J. LOVETT, OF CHICAGO, ILLINOIS, ASSIGNOR TO THE BUDD DOBLE TIRE COMPANY, OF NEW YORK, N. Y.

CUSHIONED HORSESHOE.

SPECIFICATION forming part of Letters Patent No. 655,827, dated August 14, 1900.

Application filed June 17, 1898. Serial No. 683,691. (No model.)

*To all whom it may concern:*

Be it known that I, THOMAS J. LOVETT, of Chicago, in the county of Cook and State of Illinois, have invented certain new and useful Improvements in Horseshoes; and I do hereby declare the following specification, taken in connection with the accompanying drawings, forming a part of the same, to be a full, clear, and exact description thereof.

The invention relates to that class of horseshoes which are provided upon their under surface with rubber or other suitable yielding or cushioning material to prevent slipping on smooth pavements and to cushion or deaden the shocks in traveling upon hard and rough pavements.

The object of the invention is to provide a shoe of the above character which is light and durable and in which the cushion-blocks are securely attached to the metal plate of the shoe; and to that end it consists in the features hereinafter described, and set forth in the claims.

Figure 4:
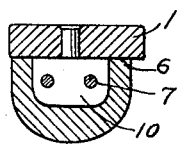
Figure 3:
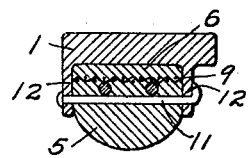
Figure 2:
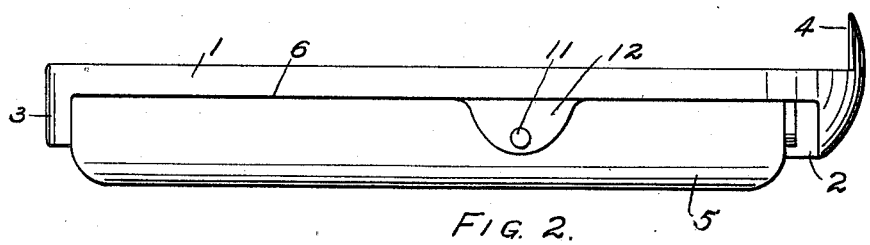
Figure 1:
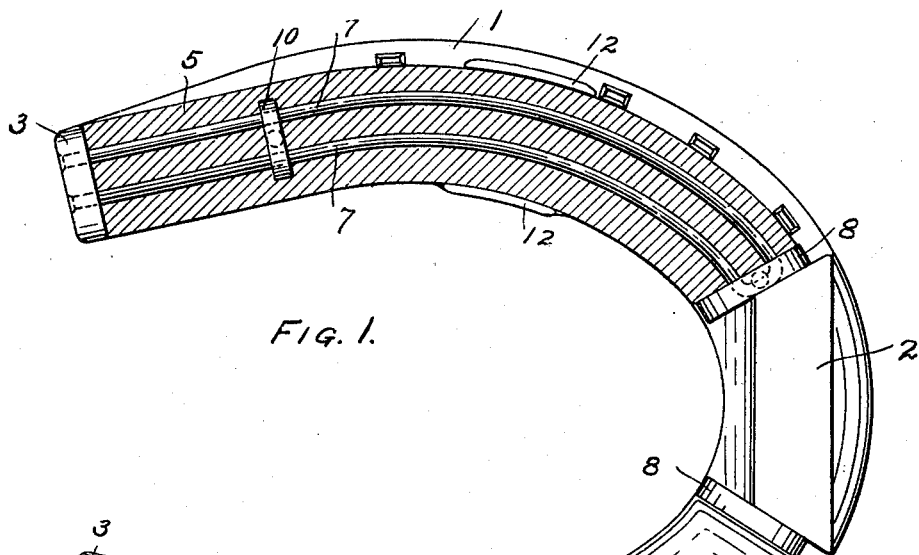
Figure 1:
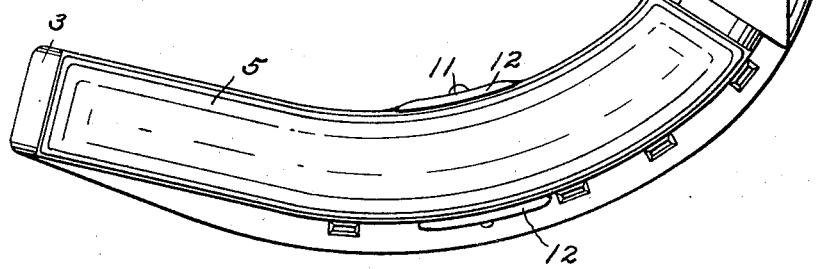

Referring to the drawings, Figure 1 is a plan view of a horseshoe embodying the features of the present invention, one cushion-block being shown in section. Fig. 2 is a side elevation of the horseshoe. Figs. 3 and 4 are sectional detail views. Fig. 5 is a plan view of one side of a modified form of horseshoe. Fig. 6 is a detached side elevation. Fig. 7 is a plan view of one side of another modification. Fig. 8 is a section on line 8 8, Fig. 7. Fig. 9 is a plan view of one side of another modification; and Fig. 10 is a section on line 10 10, Fig. 9.

The curved plate 1 of the shoe is provided with the toe-calk 2 and the heel-calks 3, which may be of any suitable substance, and are preferably of metal formed integral with the plate 1. The base 1 may also be provided with a toe-piece 4 for engaging the hoof of the animal to which the shoe is secured.

The shoe is provided on each side with a cushion-block 5, which may substantially fill the space between the heel and toe calk, as shown in Fig. 1, or may only partially fill said space, as in Fig. 5. The blocks 5 may be made of any suitable material, as leather, rubber, or composition, or they may be made of several different materials; but it is preferred to form said blocks of rubber.

As shown in Figs. 1 and 2, the blocks 5 substantially fill the space between the heel and toe calk and said blocks are preferably of sufficient thickness to extend below the heel and toe calks. The blocks may be of any desired cross-section and are provided with a base 6, which fits against the under side of the base-plate 1. The blocks are secured to the base-plate by means of one or more wires 7, which pass through said block and are secured or anchored to the base-plate at the ends of said blocks. The wire or wires may be secured or anchored to the base-plate in any suitable manner, as by extending said wires into the toe and heel calks or into studs secured to the base-plate adjacent to said calks. As shown, a wire 7 passes through each block 5 and is looped through a stud 8, secured to the base-plate at the end of the block, and then passes back through the block, the ends of the wire being inserted in holes or recesses in the heel-calk 3. Thus each cushion-block is securely held in place upon the base-plate by two strands of wire, which are secured or anchored to said plate. In this construction the toe-calk 2 forms a lug for protecting the stud 8 from a blow or shock which might bend or detach said stud from the base-plate.

In Figs. 5 and 6 is shown a shoe in which the cushion-block 5 only partially fills the space between the heel and the toe calks. As shown in these views, the wires for securing the block to the base-plate 1 are secured or anchored to the base-plate at the ends of the block by extending said wires into studs 15 and 16, secured to the base-plate. The wire 13 is looped through the stud 16 and the two strands of the wire pass through the block 5, the ends of the wire being extended into the stud 15. In this form of shoe, in which the yielding block does not extend to the toe-calk, a lug, as 17, is preferably formed upon the plate 1 in front of stud 16 to prevent the displacement or breakage of said stud by blows or shocks when the shoe strikes the ground.

In Figs. 7 and 8 is shown a shoe in which the toe-calk is extended for a distance along the side of the shoe, said calk being cut away at 18 to lighten the shoe. This construction is desirable for the reason that the greater part of the wear comes upon the toe region of a shoe, and the life of the shoe is therefore prolonged by forming the tread at this part of the shoe of durable material. In this shoe the cushion-block 5 extends from the heel to the extension of the toe-calk and is secured to the base-plate, as in the shoe shown in Fig. 5—that is, by a wire looped through a stud 20 and having its ends extending into a stud 21.

In Figs. 9 and 10 is shown a modified form of shoe. In this shoe the extension of the toe-calk is in the form of a rib 22, which is enlarged at 23 to form a lug for protecting the stud 24 at the end of the cushion-block 5. The block 5 is secured to the base-plate by a wire 26, passing through said block, and the studs 24 and 27, secured to the base-plate.

The material of which the cushion-blocks are formed may be of such a character that the wires 7 are liable to tear through such material, and in such case it is desirable to embed a strip of strengthening material in said blocks above the wires to prevent this tearing action. The strip of strengthening material may be of any suitable material; but it is preferably of perforated metal. In Fig. 3 is shown a section of a block provided with a strengthening-strip consisting of woven wire 9 embedded therein above the wires 7. The woven wire may be secured in the block in case said block is formed of rubber in the vulcanizing operation, and thus become an integral part of the block, the rubber extending through the openings or perforations between the wires, and thus securely holding the strip of woven wire in place.

In case the blocks are long, as when they extend from the heel to the toe calk, or in case small wires are used it may be desirable to secure said blocks to the base-plate intermediate of their ends, and in Fig. 1 means are shown for thus securing the blocks at two points intermediate of their ends. The means shown for securing the blocks to the base-plate in themselves form features of invention which may be used in other relations. One of these means consists of a stud 10, secured to the base-plate and provided with perforations through which the wires 7 are passed. As shown, this stud fits within a recess in the tread-section 5, and in connection with the wires 7 serves to bind the block securely to the base-plate without materially effecting the cushioning effect of the block. The other securing means consists of a transverse pin 11, which extends through the block below the wires 7 and has its ends secured to the base-plate by means of clips 12 on opposite sides of the block. The clips 12 not only secure the ends of the pin 11 to the base-plate, but they also serve to hold the block 5 against lateral displacement, and one or more of said clips may be used with advantage for this latter purpose in cases where it is not deemed desirable to use the cross-pins.

What I claim as my invention, and desire to secure by Letters Patent, is—

1. A horseshoe having a base-plate, a cushion-block on each side of the shoe, and one or more wires extending longitudinally through each block, said wires being secured to the base-plate, substantially at the ends of the blocks and serving to bind said blocks to the under side of the base-plate, substantially as described.

2. A horseshoe having a base-plate, a cushion-block on each side of the shoe, and one or more wires extending through each block, said wire or wires being secured to the base-plate at each end of said block and serving to bind said blocks to the under side of the base-plate, substantially as described.

3. A horseshoe having a base-plate, a toe-calk, a cushion-block on each side of the shoe, and one or more wires extending through each block, said wire or wires being secured to the base-plate at the heel and toe, substantially as described.

4. A horseshoe having a base-plate, a toe-calk, heel-calks, a cushion-block on each side of the shoe extending from the toe-calk to the heel-calk, and one or more wires extending through each block, said wire or wires being secured to the base-plate at each end of said block, substantially as described.

5. A horseshoe having a base-plate, a cushion-block on each side of the shoe, one or more wires extending through each block, said wire or wires being secured to the base-plate at each end of said block, and means for securing said blocks to the base-plate between the ends of said blocks, substantially as described.

6. A horseshoe having a base-plate, a cushion-block on each side of the shoe, one or more wires extending through each of said blocks, said wire or wires being secured to the base-plate at the ends of said block, and one or more clips at the side of each block, substantially as described.

7. A horseshoe having a base-plate, a cushion-block on each side of the shoe, one or more wires extending through each of said blocks, said wire or wires being secured to the base-plate at the ends of said block, clips on opposite sides of each block, and cross-pins having their ends secured in said clips and passing below said wire or wires, substantially as described.

8. A horseshoe having a base-plate, a cushion-block, a looped wire the two strands of which pass through said block, the loop of said wire being secured to the base-plate at one end of said block, and the ends of said wire being secured to the base-plate at the other end of said block, substantially as described.

9. A horseshoe having a base-plate, a stud secured to the base-plate, a cushion-block extending from the heel to said stud, a wire looped through the stud and having its two strands passing through said block and secured to the base-plate at the heel, substantially as described.

10. A horseshoe having a base-plate, a stud secured to said base-plate adjacent to the toe-calk, a cushion-block extending from the heel to said stud, a wire looped through said lug and having its two strands passing through said tread-section and secured to the base-plate at the heel, substantially as described.

11. A horseshoe having a base-plate, a cushion-block, one or more wires passing through said block, said wire or wires being secured to the base-plate at the ends of said block, and one or more clips for preventing lateral displacement of said block, substantially as described.

12. A horseshoe having a base-plate, a cushion-block having a strengthening-strip embedded therein, one or more wires extending through said block below said strip, and means for securing said wire or wires to the plate, substantially as described.

13. A horseshoe having a base-plate, a cushion-block having a strip of woven wire embedded therein, one or more wires extending through said block below the woven wire, and means for securing said wire or wires to the base-plate, substantially as described.

14. A horseshoe having a base-plate, a perforated stud on the under side of said plate intermediate the heel and toe calks, a cushion-block, and one or more wires extending through said stud and block, substantially as described.

15. A horseshoe having a base-plate, a stud secured to the under side of said base-plate, a cushion-block extending from the heel to said stud, one or more wires passing through said block and into said stud, and a lug for protecting said stud, substantially as described.

16. A horseshoe having a base-plate, a cushion-block, clips for preventing the lateral displacement of said block, one or more wires extending through said block, and a cross-pin passing through said clips and below said wire or wires, substantially as described.

THOMAS J. LOVETT.

Witnesses:
M. S. MACKENZIE,
M. J. FROST.